United States Patent
Grandich et al.

(10) Patent No.: US 9,739,393 B2
(45) Date of Patent: Aug. 22, 2017

(54) VALVE CONTROLLER WITH FLAPPER NOZZLE PILOT VALVE

(71) Applicant: Pentair Flow Services AG, Schaffhausen (CH)

(72) Inventors: Raymond P. Grandich, Oradell, NJ (US); William F. Tatum, Davidson, NC (US)

(73) Assignee: Pentair Flow Control AG, Schaffhausen (CH)

( * ) Notice: Subject to any disclaimer, the term of this patent is extended or adjusted under 35 U.S.C. 154(b) by 43 days.

(21) Appl. No.: 14/613,033

(22) Filed: Feb. 3, 2015

(65) Prior Publication Data

US 2015/0219238 A1 Aug. 6, 2015

Related U.S. Application Data

(60) Provisional application No. 61/935,954, filed on Feb. 5, 2014.

(51) Int. Cl.

| | |
|---|---|
| *F16K 31/122* | (2006.01) |
| *F16K 3/24* | (2006.01) |
| *F16K 31/42* | (2006.01) |
| *F16K 31/06* | (2006.01) |
| *F15B 13/043* | (2006.01) |

(52) U.S. Cl.
CPC ...... *F16K 31/0641* (2013.01); *F15B 13/0438* (2013.01); *F16K 31/0613* (2013.01); *Y10T 137/8671* (2015.04); *Y10T 137/86614* (2015.04)

(58) Field of Classification Search
CPC ............ F16K 31/0641; F16K 31/0613; F15B 13/0438; F15B 13/043; F15B 13/00; Y10T 137/86614; Y10T 137/8671
See application file for complete search history.

(56) References Cited

U.S. PATENT DOCUMENTS

| | | |
|---|---|---|
| 2,964,051 A | 12/1960 | Garnett |
| 3,209,782 A | 10/1965 | Wolpin et al. |
| 3,443,582 A | 5/1969 | Linden |
| 3,516,441 A | 6/1970 | McCormick |
| 3,586,287 A | 6/1971 | Knobel |
| 3,645,293 A | 2/1972 | Pedersen |
| 3,698,437 A | 10/1972 | Cox |
| 3,817,488 A | 6/1974 | Mack |
| 3,910,314 A | 10/1975 | Nicholson |
| 4,325,399 A | 4/1982 | Frick |
| 4,524,804 A | 6/1985 | Goedecke et al. |
| 4,532,951 A | 8/1985 | Fermanich |
| 4,579,137 A | 4/1986 | Brandt |
| 4,615,353 A | 10/1986 | McKee |

(Continued)

OTHER PUBLICATIONS

Loh, J. Foundation™ Fieldbus Fieldbus Basics & its Benefits. Yokogawa Engineering Asia on behalf of Fieldbus Foundation TM. Vietnam FF Seminar Mar. 18, 2010. [retrieved from the Internet Jul. 28, 2015].

*Primary Examiner* — Craig Schneider
*Assistant Examiner* — Kevin Barss
(74) *Attorney, Agent, or Firm* — Quarles & Brady LLP

(57) ABSTRACT

A valve controller configured to operate on a Foundation Fieldbus Network and including a spool valve movable between at least an opening position and a closing position, and a flapper nozzle pilot valve arranged to move the spool between the opening position and the closing position.

18 Claims, 2 Drawing Sheets

(56) References Cited

U.S. PATENT DOCUMENTS

| | | | |
|---|---|---|---|
| 4,699,175 | A | 10/1987 | Anderson et al. |
| 4,705,059 | A | 11/1987 | Lecerf et al. |
| 4,722,360 | A | 2/1988 | Odajima et al. |
| 4,875,502 | A | 10/1989 | Romano |
| 4,893,782 | A | 1/1990 | Franke |
| 5,240,041 | A | 8/1993 | Garnjost |
| 5,474,100 | A | 12/1995 | Nishijima et al. |
| 5,628,491 | A | 5/1997 | Krone |
| 5,906,218 | A | 5/1999 | Carey |
| 5,938,098 | A | 8/1999 | Fife |
| 6,079,435 | A | 6/2000 | Franz et al. |
| 6,644,351 | B2 | 11/2003 | LaMarca et al. |
| 6,676,107 | B2 | 1/2004 | Sticht |
| 6,755,115 | B2 | 6/2004 | Stoll et al. |
| 7,234,483 | B2 | 6/2007 | Kainuma et al. |
| 7,744,060 | B2 | 6/2010 | Sneh |
| 8,083,205 | B2 | 12/2011 | Sneh |
| 8,172,197 | B2 | 5/2012 | Gu et al. |
| 8,245,729 | B2 | 8/2012 | Zub |
| 2010/0032595 | A1 | 2/2010 | Zub |
| 2010/0252132 | A1 | 10/2010 | Neff et al. |
| 2010/0313960 | A1 | 12/2010 | Askew et al. |
| 2011/0131455 | A1* | 6/2011 | Law ................ H04B 3/548 714/40 |
| 2012/0216896 | A1 | 8/2012 | Hayashi et al. |

\* cited by examiner

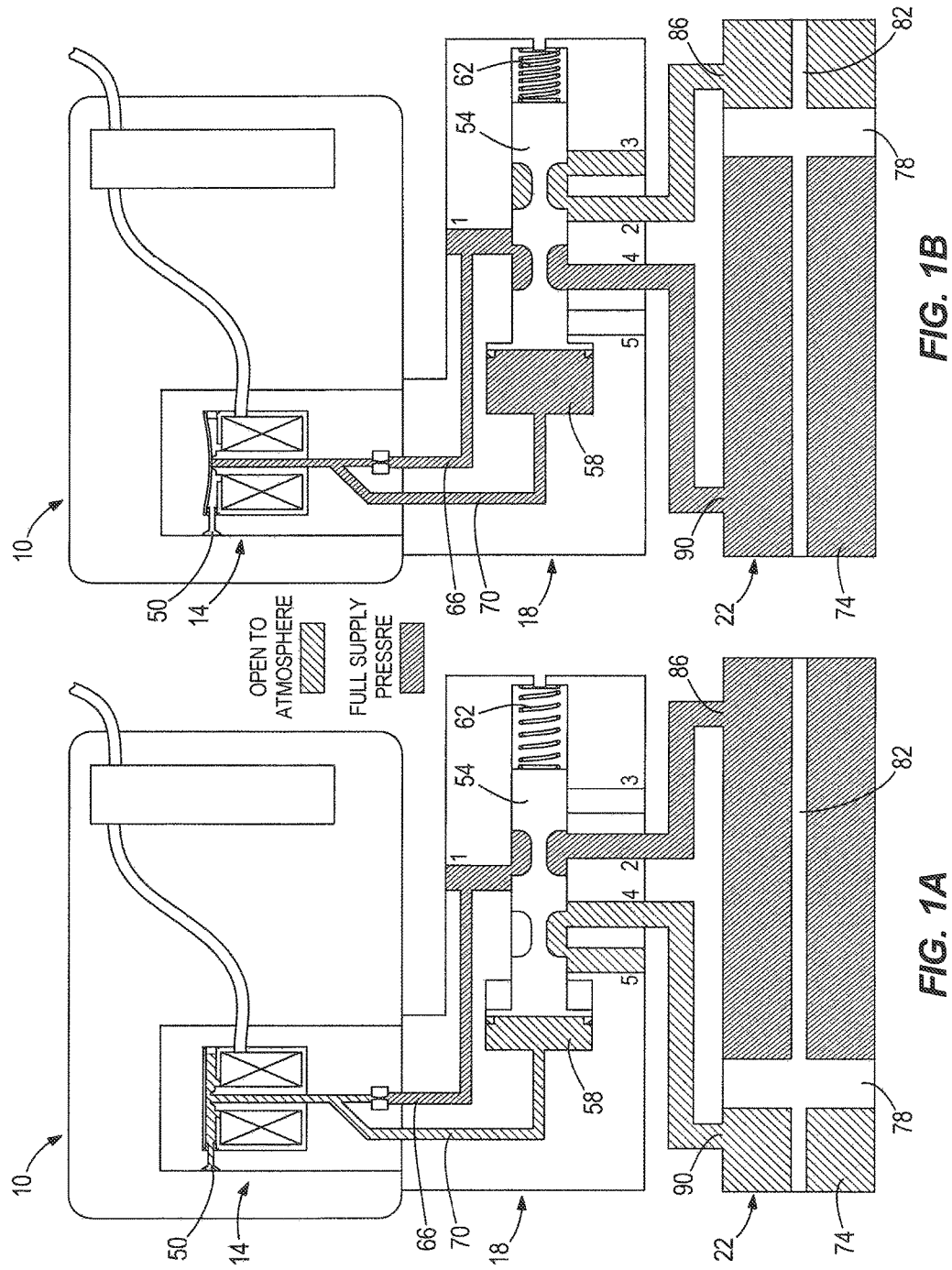

VALVE CONTROLLER WITH FLAPPER NOZZLE PILOT VALVE

CROSS REFERENCES TO RELATED APPLICATIONS

This application claims the benefit of U.S. Provisional Patent Application No. 61/935,954 filed on Feb. 5, 2014, the entire contents of which are incorporated herein by reference.

BACKGROUND

The invention relates generally to valve controllers for use in a plant or factory automation environment. More specifically the invention relates to solenoid piloted valve controllers used in Foundation Fieldbus (FF) networks.

FF networks are commonly used in process plants to provide power and control signals to field devices that control the position of control valves. FF networks are fully digital and operate on limited power. 10-30 mA of current at between 9 to 32 Volts are typical levels. Therefore, field devices that are powered on the FF network need to function on very low power. Traditional discrete automated valve controllers use piezo pilot valves to drive a larger spool valve which shuttles air to pneumatic actuators to turn process valves. Piezo technology allows the field devices to function at the low powers provided by the FF network.

BRIEF SUMMARY OF THE INVENTION

Piezo pilot valves are limited by their ambient operating temperature range and therefore present an undesirable constraint. Piezo pilot valves provide an operating temperature range of between −20° C. to +65° C. In applications requiring an operating temperature below −20° C. or higher that +65° C. piezo pilot valves are unsuitable.

In one aspect, the present invention provides a valve controller configured to operate on a Foundation Fieldbus (FF) Network and includes a spool valve movable between at least an opening position and a closing position, and a flapper nozzle pilot valve arranged to move the spool between the opening position and the closing position.

In an additional aspect, the present invention provides a pilot valve for a valve controller. The pilot valve includes a flapper portion configured to transition between a rest position and a deflected position, a nozzle portion configured to receive an electrical signal, and a flow restricting orifice configured to control air flow into the pilot valve The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 1A is a schematic diagram of a valve controller showing a flapper nozzle valve in a rest position and a spool valve in an open position.

FIG. 1B is a schematic diagram of a valve controller showing the flapper nozzle pilot valve in a deflected position and the spool valve in the closed position.

Figure 2A:
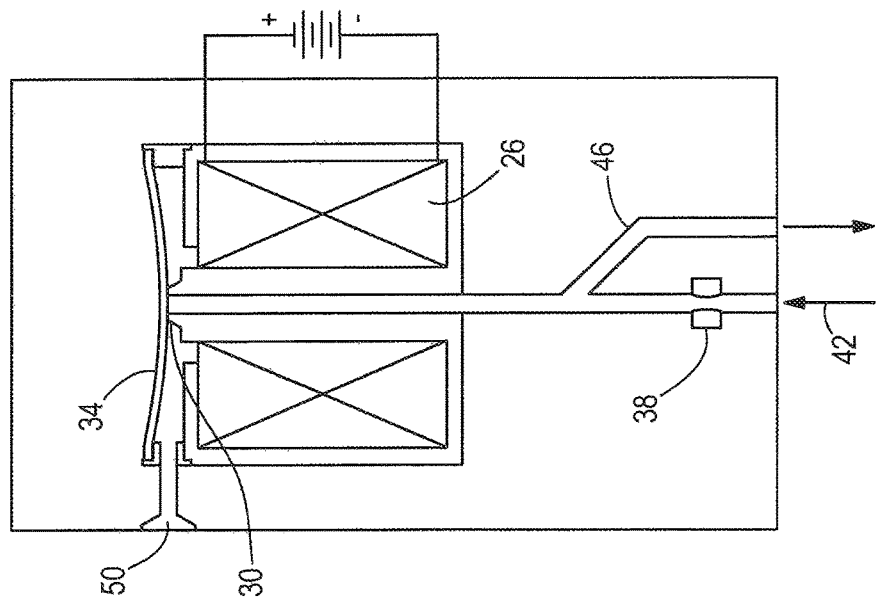
FIG. 2A is a detailed view of the flapper nozzle pilot valve in the rest position.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The invention overcomes the temperature limitation of piezo pilot valves in the valve controller field device by replacing the piezo pilot valve with a flapper nozzle valve. The flapper nozzle valve allows the operating temperature range to be extended to about −40° C. to +105° C.

Unlike the piezo pilot valve function, which is a standard 3-way normally closed valve, flapper nozzle valves are traditionally used as a current-to-pressure transducer in a modulating field device. The invention reapplies the flapper nozzle valve to be used in a discrete fashion as a flapper nozzle pilot valve. The electrical power applied to the flapper nozzle pilot valve can be comparable to the electrical power of the piezo pilot valve (0 volts, +6 Volts DC).

FIG. 1A shows a valve controller 10 with no electrical power applied to a pilot 14. FIG. 2B shows +6 VDC electrical power applied to the pilot 14. The valve controller 10 may also include a spool valve 18 and a valve actuator 22, for example a pneumatic valve actuator.

Figure 2B:
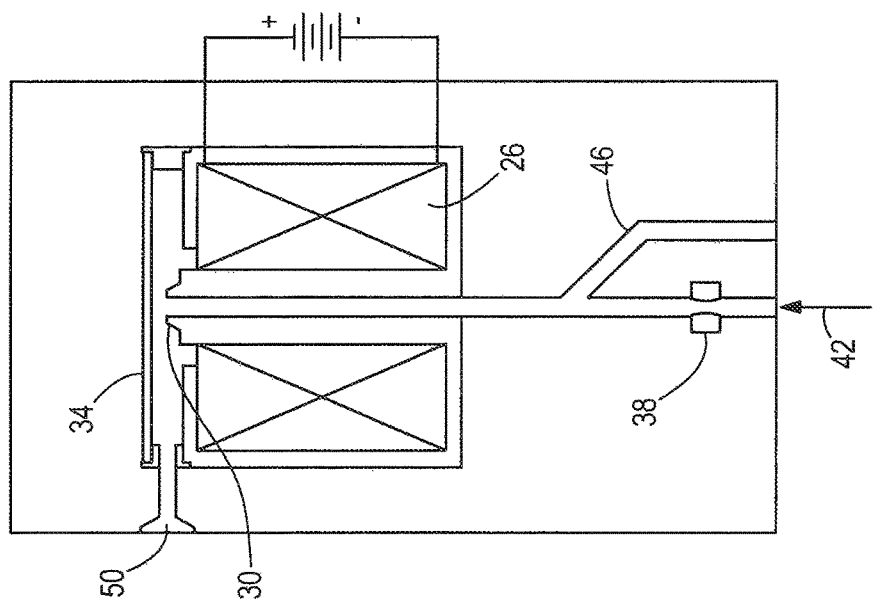
FIG. 2B is a detailed view of the flapper nozzle pilot valve in the deflected position.

With reference to FIGS. 2A and 2B, the pilot 14 includes a solenoid 26, a flapper nozzle valve 32 having a nozzle 30 and a flapper 34, a flow restricting orifice 38, a supply port 42, an outlet port 46, and an exhaust 50.

Turning back to FIG. 1A, the spool valve 18 includes a spool 54 with a spool head 58, a spring 62 that biases the spool 54, an air supply port 1 in communication with an air supply, for example a high pressure gas supply, an open port 2, an exhaust port 3, a close port 4, an exhaust port 5, a supply port 66 in communication with the supply port 42 of the pilot 14, and a head port 70 in communication with the outlet port 46 of the pilot 14.

The valve actuator 22 includes a cylinder 74, a piston head 78, an actuating rod 82, an open port 86 in communication with the open port 2 of the spool valve 18, and a close port 90 in communication with the close port 4 of the spool valve 18. In other constructions, the valve actuator 22 could be designed differently. For example, a rotary actuator or other non-linear actuator may be used. The design of the linear actuator is non-limiting.

In FIG. 1A, no electrical power is provided to the pilot 14 such that the flapper 34 is in a rest position as shown in FIG. 2A. When the flapper 34 is in the rest position, a flow path is provided from the head 58 of the spool 54 through the head port 70, the outlet port 46, and the nozzle 30 to vent through the exhaust 50. High pressure air is restricted from flowing into the pilot 14 by the flow restricting orifice 38. With the pressure vented from the head 58, the spring 62 biases the spool 54 to an open position. When the spool 54 is in the open position, the high pressure air flows from the air supply port 1, through the spool 54 to the open port 2 and into the open port 86 of the valve actuator 22 thereby moving the piston head 78 to an open position and actuating a process valve.

Turning to FIG. 1B, electrical power, for example +6 VDC, is provided to the pilot 14 such that the flapper 34 is in a deflected position as shown in FIG. 2B. When the flapper 34 is in the deflected position, the exhaust 50 becomes isolated, allowing full air pressure to pass from the air supply port 1, through the supply port 66, the nozzle 30, and to the outlet port 46. High pressure air is then provided to the head 58 such that the spring 62 bias is overcome and the spool 54 is forced to a closed position. When the spool 54 is in the closed position, the high pressure air flows from the air supply port 1, through the spool 54 to the close port 4 and into the close port 90 of the valve actuator 22 thereby moving the piston head 78 to the closed position and actuating a process valve.

The above description relates to a normally open valve, although the valve controller 10 could be used for a normally closed valve. Therefore, all reference to open or closed positions is not binding and may be reversed or changed, as desired, by one skilled in the art.

One application for this invention is improved valve control in gas turbine power plants which use foundation fieldbus networks and may have temperature requirements of up to 105° C. An operating current range of about 10-30 mA, together with the operating voltage range of approximately 0V to 6V provided by the foundation fieldbus network can provide the limited power used by the pilot. Foundation fieldbus networks are all-digital, bi-directional, multi-drop communication systems. Other applications of the invention may include any process control plants, including but not limited to use in the following industries: power generation, oil & gas, refining, food processing, bio-pharmaceutical, and water treatment.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements within the spirit and scope of the invention.

The invention claimed is:

1. A system for controlling the position of a valve, the system comprising:
   a spool valve moveable between at least a first position and a second position; and
   a pilot having a flapper nozzle valve arranged to selectively receive power from a foundation fieldbus network, the flapper nozzle valve movable between a rest position wherein the pilot actuates the spool valve toward the first position, and a deflected position wherein the pilot actuates the spool toward the second position, the flapper nozzle valve moveable between the rest position and the deflected position in response to the power received from the foundation fieldbus network and further wherein the pilot further includes a flow restricting orifice configured to restrict air flow into the pilot.

2. The system of claim 1, further comprising a valve actuator in communication with the spool valve, the valve actuator having a cylinder, an actuating rod disposed within the cylinder, and a piston head disposed within the cylinder and movably engaged with the actuating rod.

3. The system of claim 1, wherein the foundation fieldbus network supplies an operational current range of about 10 mA to 30 mA.

4. The system of claim 1, wherein the foundation fieldbus network is configured to deliver an electrical output range of about 0 volts to 6 volts.

5. The system of claim 1, wherein the pilot further includes a first supply port, an outlet port, and an exhaust.

6. The system of claim 5, wherein the spool valve further includes an air supply port in communication with an air supply, a second supply port and a head port, and
   wherein the first supply port is in pneumatic communication with the second supply port and the outlet port is in pneumatic communication with the head port.

7. The system of claim 6, wherein the spool valve further includes a spring arranged to bias the spool valve, and
   wherein a flow path from the air supply port flows through the head port, the outlet port, and the nozzle, and vents through the exhaust, causing the spring to move the spool valve to the first position, in response to an absence of power received from the foundation fieldbus network.

8. The system of claim 1, wherein the system has a temperature operating range of about −40° C. to +105° C.

9. The system of claim 1, wherein the first position is an open position and the second position is a closed position.

10. A pilot for a valve controller, the pilot comprising:
    a flapper nozzle valve arranged to selectively receive power from a foundation fieldbus network, the flapper nozzle valve movable between a rest position and a deflected position, the flapper nozzle valve moveable between the rest position and the deflected position in response to the power received from the foundation fieldbus network;
    a supply portion configured to receive air;
    an outlet portion configured to dispel air; and
    an exhaust.

11. The pilot of claim 10, further comprising a flow restricting orifice arranged in the supply port and configured to restrict air flow into the pilot,
    wherein the flow restricting orifice inhibits air flow into the pilot when the flapper nozzle valve is arranged in the rest position, and
    wherein the flow restricting orifice allows air flow into the pilot when the flapper nozzle valve is arranged in the deflected position.

12. The pilot of claim 10, wherein the power received from the foundation fieldbus network ranges from 0 volts to 6 volts.

13. The pilot of claim 10, wherein the flapper nozzle valve is arranged in the rest position when the power received is 0 volts, and the flapper nozzle valve is arranged in the deflected position when the electrical signal is 6 volts.

14. The pilot of claim 10, wherein the pilot has a temperature operating range of about −40° C. to +105° C.

15. A system for controlling the position of a valve, the system comprising:
    a spool valve moveable between at least a first position and a second position, the spool valve having
       a spring arranged to bias the spool valve toward the first position, an air supply port in communication with an air supply, and a first supply port and a head port each configured transfer air; and a pilot having
a flapper nozzle valve arranged to selectively receive power from a foundation fieldbus network, the flapper nozzle valve movable between a rest position wherein the pilot actuates the spool valve toward the first position, and a deflected position wherein the pilot actuates the spool toward the second position, the flapper nozzle valve moveable between the rest position and the deflected position in response to the power received from the foundation fieldbus network, a second supply port and an outlet port each configured to transfer air between the spool valve and the pilot, and a flow restricting orifice configured to restrict air flow into the pilot, and an exhaust configured to dispel air to the atmosphere, wherein in response to an absence of power received from the foundation fieldbus network, the flapper nozzle valve is arranged in the rest position and a first flow path is created between the air supply port, the head port, the outlet port, the nozzle, and the exhaust allowing the spring to move the spool valve toward the first position, and wherein in response to power received from the foundation fieldbus network, the flapper nozzle valve is arranged in the deflected position and a second flow path is created between the air supply port, the first supply port, the nozzle, and the outlet port moving the spool toward the second position against the bias of the spring.

16. The system of claim 15, wherein the flow restricting orifice is arranged in the second supply port and configured to restrict air flow into the pilot, wherein the flow restricting orifice inhibits air flow into the pilot when the flapper nozzle valve is arranged in the rest position, and wherein the flow restricting orifice allows air flow into the pilot when the flapper nozzle valve is arranged in the deflected position.

17. The system of claim 15, wherein the flapper nozzle valve is arranged in the rest position when the power received is 0 volts, and the flapper nozzle valve is arranged in the deflected position when the electrical signal is 6 volts.

18. The system of claim 15, wherein the pilot has a temperature operating range of about −40° C. to +105° C.

* * * * *